(No Model.) 5 Sheets—Sheet 1.

A. D. BAKER & F. P. HUYCK.
ROTARY ENGINE.

No. 344,339. Patented June 29, 1886.

WITNESSES
J. E. Jones
C. J. Nottingham

INVENTOR
A. D. Baker
F. P. Huyck
B. F. A. Seymour, Attorney

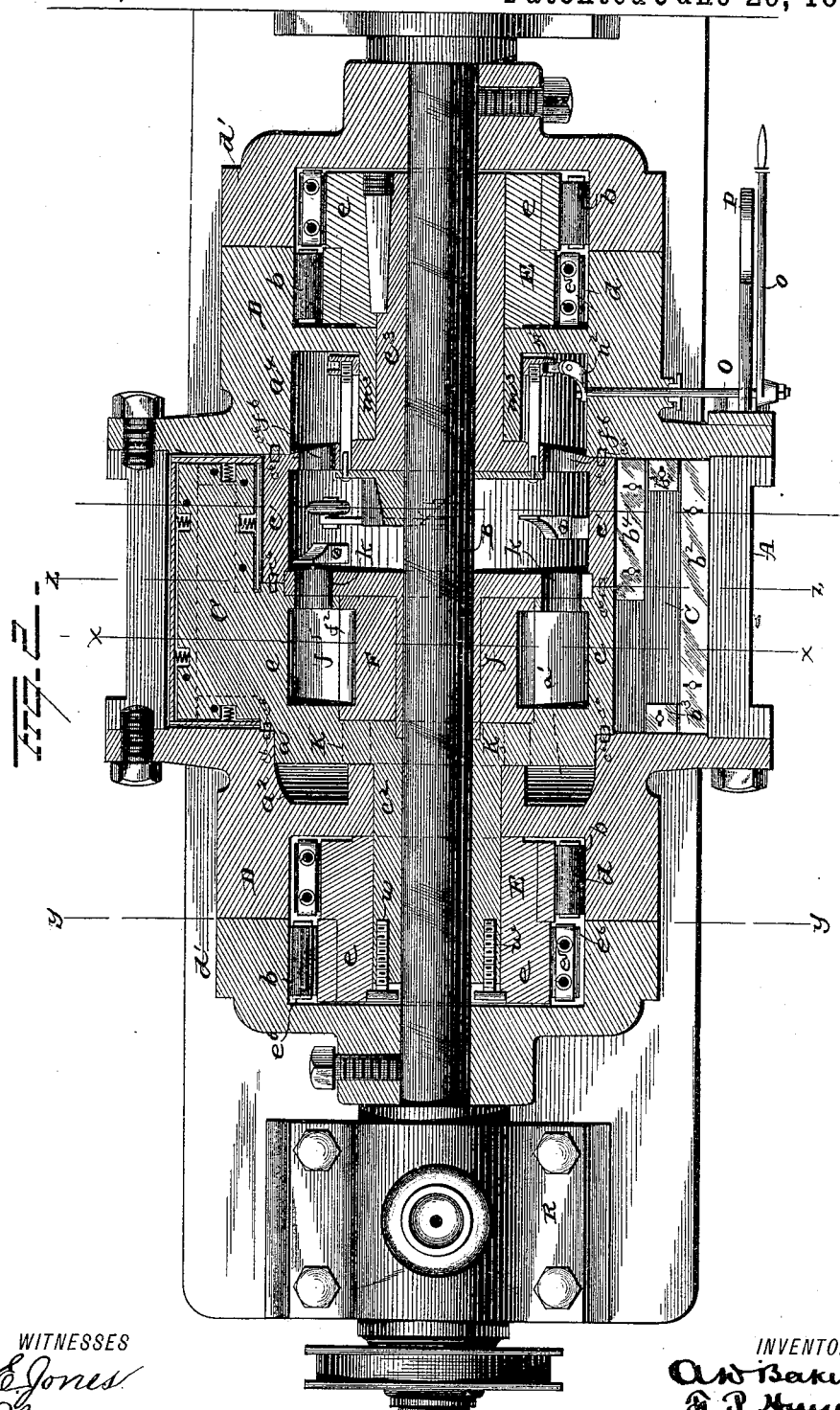

(No Model.)
A. D. BAKER & F. P. HUYCK.
ROTARY ENGINE.
No. 344,339. Patented June 29, 1886.
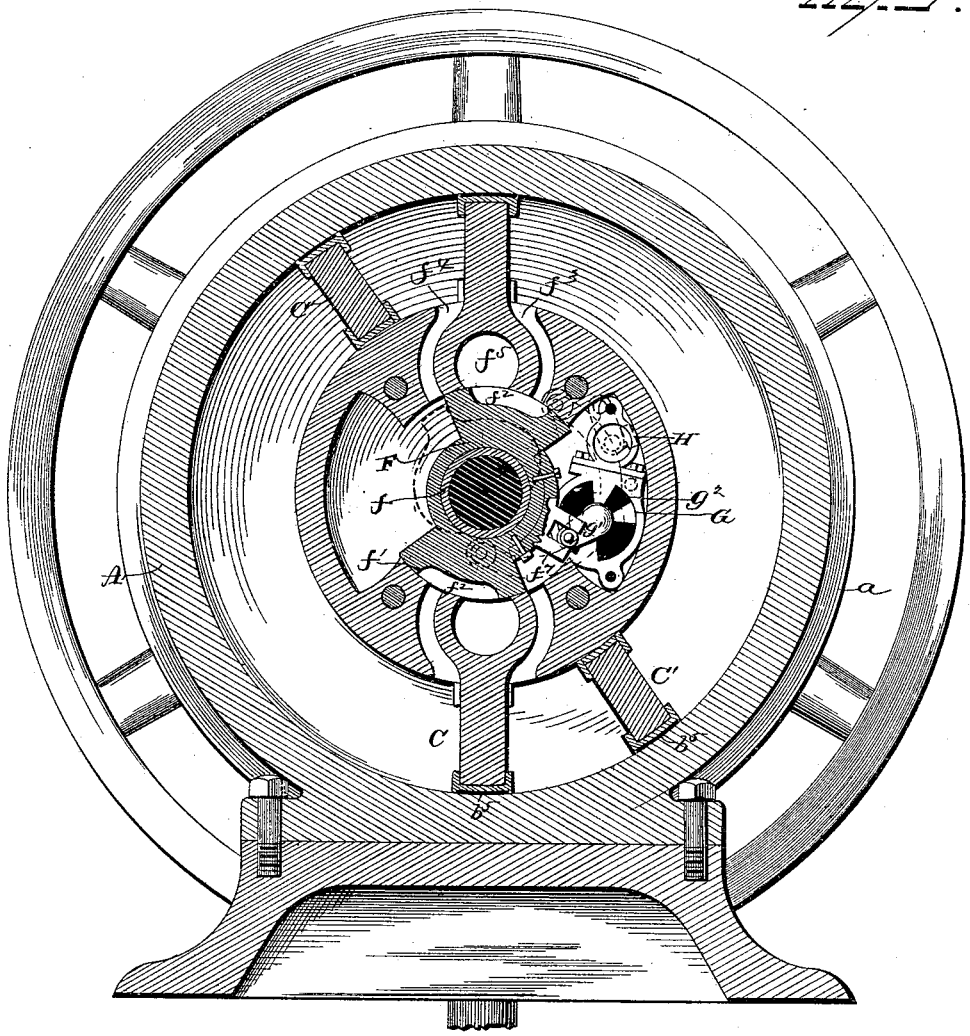
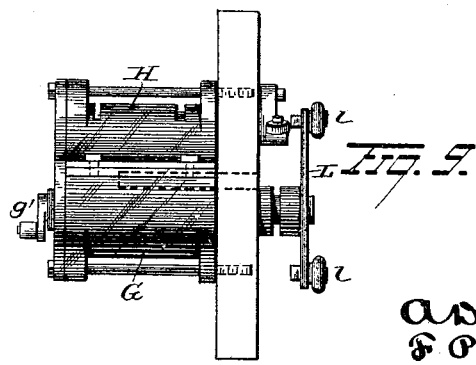
WITNESSES
J. E. Jones
G. D. Nottingham
INVENTOR
A. D. Baker.
F. P. Huyck.
By H. A. Symmons Attorney (No Model.)

A. D. BAKER & F. P. HUYCK.
ROTARY ENGINE.

No. 344,339. Patented June 29, 1886.

WITNESSES
J. E. Jones.
G. Nottingham

INVENTOR
A. D. Baker.
F. P. Huyck.
Attorney (No Model.)
A. D. BAKER & F. P. HUYCK.
ROTARY ENGINE.
No. 344,339.  Patented June 29, 1886.
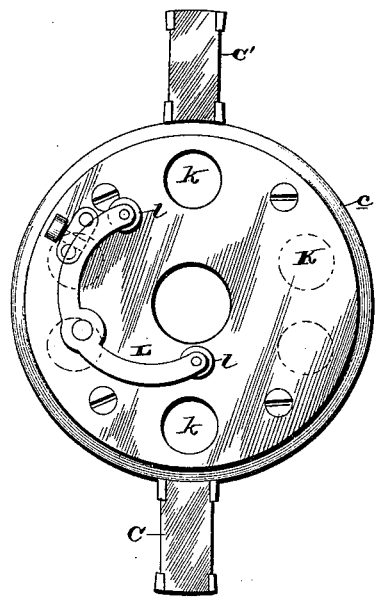
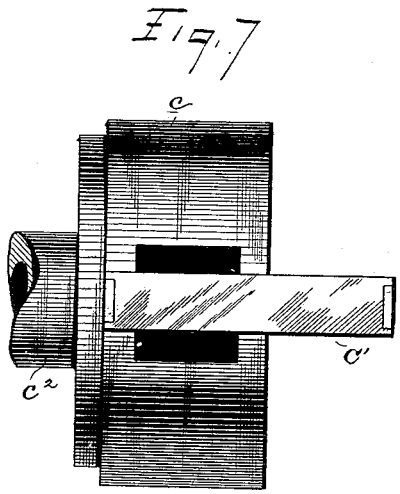
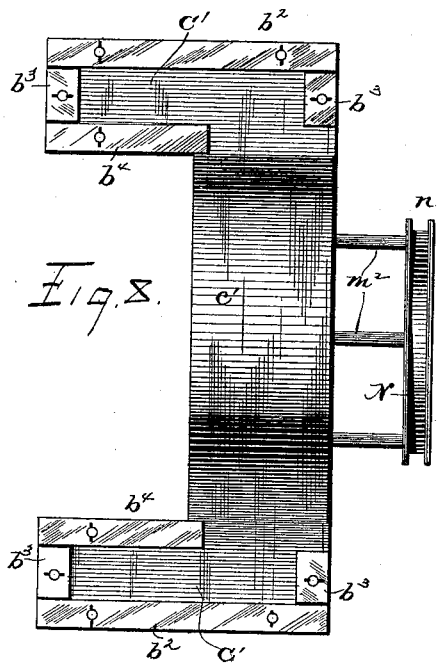
WITNESSES
J. E. Jones
E. J. Nottingham
INVENTOR
A. D. Baker
F. P. Huyck
By H. A. Seymour Attorney

UNITED STATES PATENT OFFICE.

ABNER D. BAKER AND FRANCIS P. HUYCK, OF SWANTON, ASSIGNORS OF TWO-THIRDS TO J. F. SEIBERLING, OF AKRON, AND A. E. ROBERTS, OF NORWALK, OHIO.

ROTARY ENGINE.

SPECIFICATION forming part of Letters Patent No. 344,339, dated June 29, 1886.

Application filed November 5, 1885. Serial No. 181,946. (No model.)

*To all whom it may concern:*

Be it known that we, ABNER D. BAKER and FRANCIS P. HUYCK, of Swanton, in the county of Fulton and State of Ohio, have invented certain new and useful Improvements in Rotary Engines; and we do hereby declare the following to be a full, clear, and exact description of the invention, such as will enable others skilled in the art to which it appertains to make and use the same.

Our invention relates to an improvement in rotary engines. The object of the same is to provide a motor which will utilize a maximum amount of steam, gas, or water power.

A further object is to provide an automatic variable cut-off valve and valve mechanism of improved construction, and located in an advantageous position.

A further object is to provide against dead-centers common to all crank motions, and cause the stroke to be of equal force throughout its entire length.

With these ends in view our invention consists in certain features of construction and combinations of parts, as will be hereinafter fully described, and pointed out in the claims.

Figure 10:
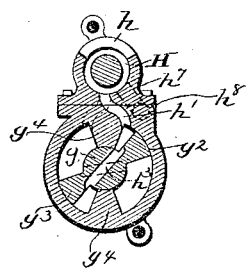
Figure 11:
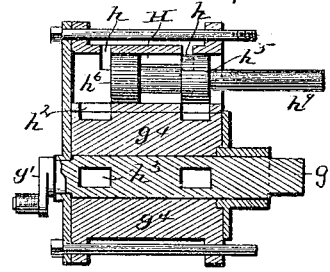
Figure 12:
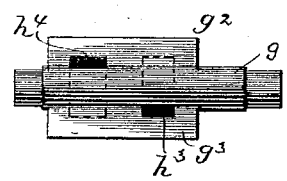
Figure 1:
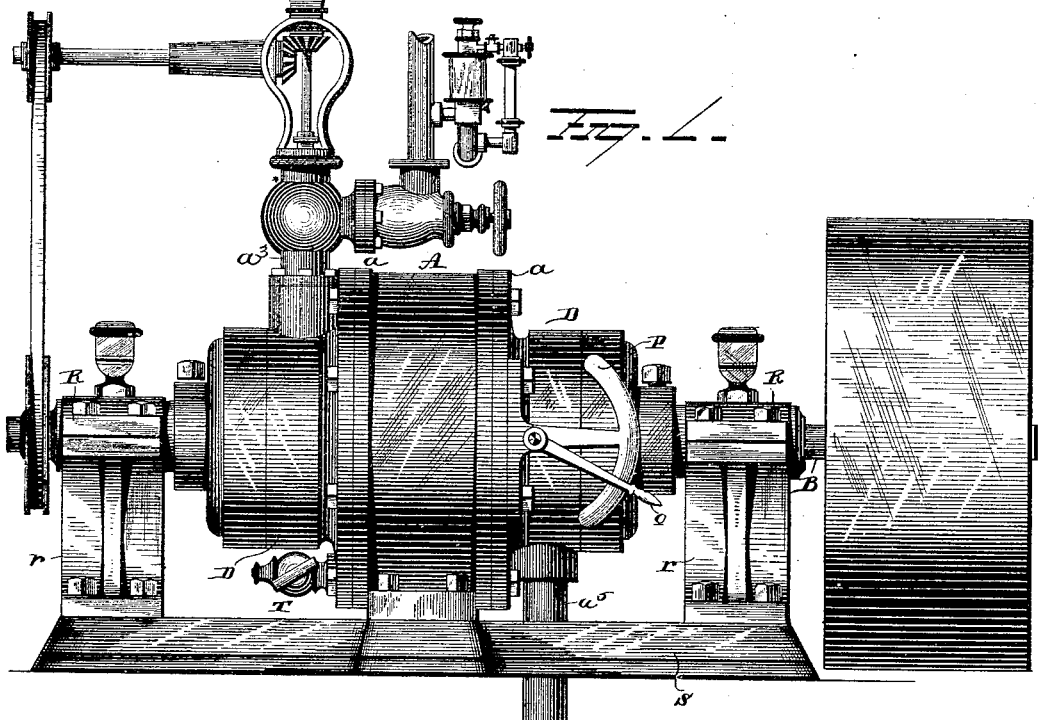
Figure 4:
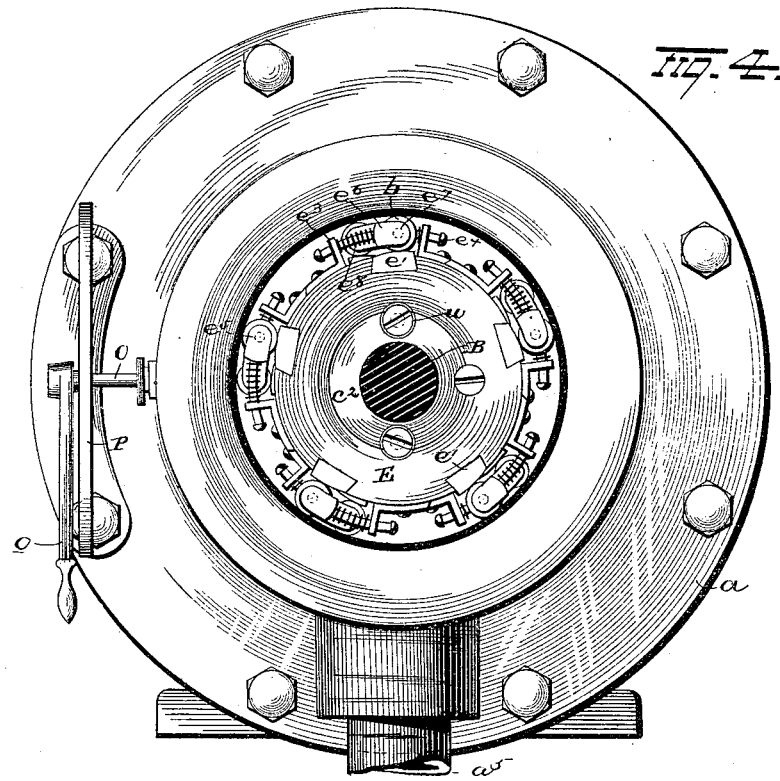
Figure 5:
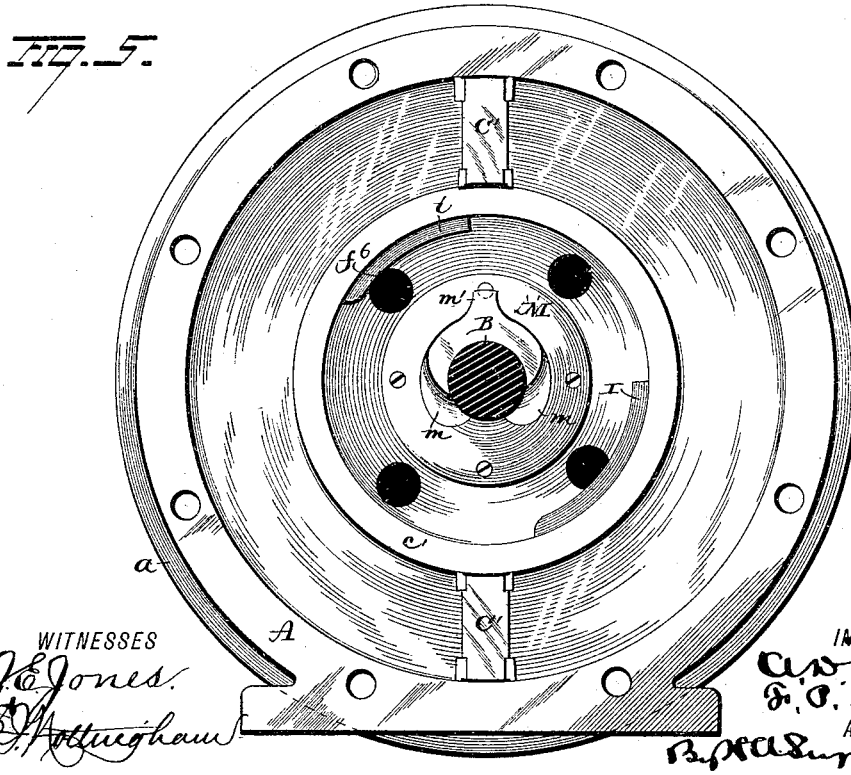

In the accompanying drawings, Figure 1 is a view of the motor in side elevation. Fig. 2 is a horizontal longitudinal section of the same through the shaft. Fig. 3 is a transverse vertical section through line $x$ $x$ of Fig. 2. Fig. 4 is a view on line $y$ $y$ of Fig. 2. Fig. 5 is a view on line $z$ $z$ of Fig. 2, parts removed. Figs. 6 and 7 are detached views of the steam-chest hub. Fig. 8 is a detached view of the exhaust-piston hub. Figs. 9, 10, and 11 are detached views of the auxiliary valve-actuating engine, said views being taken, respectively, in side elevation, transverse section, and longitudinal section. Fig. 12 is a detached view of the valve-actuating piston.

A represents a plain cylinder, the heads $a$ of which are bolted thereto in the ordinary manner, or in any approved manner. The heads $a$ are each provided on their inner sides with an annular recess, one of which, $a'$, is connected by a suitable chamber, $a^2$, with the steam-supply $a^3$, and the other, $a^4$, is connected by a channel, $a^5$, with a suitable exhaust.

Through the center of the cylinder A extends a shaft, B, and on the shaft B, within the cylinder, are mounted the piston-hubs $c$ $c'$, each hub being provided with one or more pistons, C C', in the form of wings, extending radially from the hubs $c$ $c'$ to the concave wall of the cylinder A. The piston or pistons C, secured to the hub $c$, extend over the hub $c'$ to the end of the cylinder A, and the piston or pistons C' on the hub $c'$ extend over the hub $c$ to the opposite end of the cylinder. Thus the space within the concave wall of the cylinder A and the convex surface of the hubs $c$ $c'$ is separated by the pistons into double as many compartments as there are pistons attached to each hub.

The pistons C C' are provided on their faces, ends, and such portions of their lower edges as move in contact with the hubs with yielding metallic shoes $b^2$, $b^3$, and $b^4$, respectively. The shoes are further preferably provided with removable face-plates $b^5$, which are capable of being removed at slight expense when they have become worn, thereby saving the expense of an entirely new shoe; or a part or the whole of the several contact-wearing surfaces of the piston may be provided with yielding packing inserted therein.

The piston-hubs $c$ $c'$ are hollow, and are each secured firmly to a sleeve, the former to a sleeve, $c^2$, and the latter to a sleeve, $c^3$, which sleeves are loosely mounted on the shaft B and project through the cylinder-heads, as shown. The sleeves $c^2$ $c^3$ may either be formed integral with the ends of the hubs, or they may be constructed separately, and the hubs be attached thereto. The sleeves also have suitable bearings in the ends of the cylinder, to allow them to rotate freely therein, and at the same time admit of no play.

The outer sides of the cylinder-heads are provided with ring-projections D, concentric with the shaft B, and large enough to leave an annular space, $d$, between the shaft and ring for the introduction of a clutch-section, E. The space $d$ may be larger or smaller, as may be found desirable in practice.

On the shaft B, in close proximity to the rings D, are secured the disks $d'$, which have circular recesses formed in the faces toward the rings D for the reception of the clutch-sections $e$. The concave faces of the rings D and disks $d'$ are provided with steel, gun-metal, or other hard lining to resist wear, or are formed entirely of such hard metal. The disks $d'$ are secured rigidly to the shaft B, and the clutch-sections E and $e$ are firmly united to each other and keyed to the sleeves $c^2 c^3$ by means of a feather and groove or other equivalent or approved means. The clutch-sections E $e$ are further secured to the sleeve $c^2$ by means of one or more set-screws, $w$, adapted to engage threaded sockets in the end of the sleeve, the heads of the screws engaging for a short distance on the end of the clutch-sections. The pressure of the live steam on the end of the hub $c$ toward the live-steam chamber in the cylinder-head thus tends to force the end of the hub away from the cylinder-head, and thereby draw the end of the clutch-sections into close contact with the cylinder-head and form a steam-tight joint. The longitudinal play of the sleeve and end of the hub may be taken up at any time by means of the said set-screws.

The main features of the clutch E $e$ are fully set forth and claimed in Letters Patent No. 275,388, granted to F. P. Huyck on April 18, 1883. The clutches herein shown are, however, somewhat modified, to better adapt them to use in connection with our improved motor.

The clutch-section E is provided with a set of inclines, $e'$, on its periphery. On the periphery of each section, at the lower portion of the inclines, are secured a pair of raised ears, $e^3$, or a single ear provided with a pair of perforations, in which perforations are secured sliding bolts or rods, $e^4$, having secured to their ends toward the highest portion of the incline a cross-head, $e^5$. Each end of the cross-head is provided with a forwardly-extending arm, $e^6$, having a pivotal bearing-stud, $e^7$, adapted to loosely engage a socket in the end of the frictional roller $b$, and thereby prevent the roller from dropping out of position when the disk $d'$ is for any purpose removed. We prefer to make the cross-head and its arms of some tough metal, which will admit of having the arms spread apart to receive the roller and again closed up to retain it. Springs $e^8$, secured on the bolts or rods $e^4$ between the ears and the cross-head, prevent the rollers $b$ from receding too far from the point of action.

The clutch operates as follows: Suppose the piston C to be forced in the direction opposite the motion of the hands of a watch. The clutch-section $e$, keyed to its sleeve, grips the disk $d'$, and thereby rotates the shaft B, the piston C' being in the mean time held against a retrograde motion by the clutch E, in engagement with the ring D on the opposite cylinder-head. As the piston C reaches the limit of its stroke, its momentum is imparted to the piston C' through the medium of the steam, gas, or water compressed between the two, and the piston C' is thereby started on its stroke, the piston C being now held against a retrograde movement by the grip of the clutch-section E on the ring D at the opposite end of the cylinder and the piston C' being locked to the shaft B by means of the clutch-section $e$ and the disk $d'$. Thus each piston becomes alternately the abutment and the advancing piston, each being constantly free to move forwardly, and at no time capable of a retrograde movement, and the shaft B is continuously forced forwardly, first by one of the pistons and then by the other.

The joints between the adjacent ends of the hubs and between the ends of the hubs and the cylinder-heads are packed by means of rings $c^6$, let into the adjacent faces, as shown, the rings being loosely secured in one or both of the adjacent ends.

The hub $c$ of the piston C forms the steam-chest, in which the oscillating cut-off valve F is located. The valve F is loosely mounted on a sleeve, $f$, which may be a prolongation of the sleeve $c^2$, or a separate sleeve-section; or the valve might be mounted directly upon the shaft B.

The valve F is provided with as many faces $f'$ and valve-chambers $f^2$ as there are pistons C on one of the hubs, which may be one, two, or more—in the present instance two—which faces are adapted to form steam-tight joints (or as closely-fitting joints as consistent with a free oscillatory movement) with the concave faces of the thickened portions of the hub through which the steam-ports $f^3$ and $f^4$ extend. The valve-faces and the corresponding concave faces of the walls surrounding the ports are made tapering longitudinally of the valve to take up the wear. The ports $f^3$ and $f^4$ open into the cylinder A on opposite sides of the piston C, and when either one is closed by the face of the valve F to live steam it is open to the valve-chamber $f^2$, and hence, through the ports $f^5$ and $f^6$, into the hub $c'$, which forms the exhaust-chamber.

The valve F is provided with a radially-extending arm, $f^7$, the end of which engages the wrist-pin of a crank, $g'$, secured to the end of the rock-shaft $g$ in the auxiliary engine-cylinder G.

The valve-actuating engine hereinabove referred to forms an important feature of the motor, and is constructed substantially as follows: The cylinder G is located within the steam-chest or hub $c$, and is secured at one end to the end of the hub. The shaft $g$, to which the pistons $g^2$ and $g^3$ are secured, projects through the cylinder-head and is provided with a crank, $g'$, in engagement with the arm on the valve F, as shown. The cylinder G is provided internally with a pair of abutments, $g^4$, located diametrically opposite each other, and extending toward the axis of the cylinder to form with the shaft $g$ a close joint and separate the space within the cylinder into two compartments, in which the pistons $g^2$ and $g^3$ oscillate. The cut-off valve for admitting steam to the pistons $g^2 g^3$ is preferably of the piston type, and slides in a small cylindrical chamber, H. The ports for admitting steam to the chamber H consist of two oblong slots, $h$, extending transversely to the axis of the chamber, and the ports for admitting steam from the chamber H to the cylinder G open into the cylinder G on opposite sides of one of the abutments $g^4$, as shown at $h'\ h^2$.

To admit the live steam at the same time on both the pistons $g^2\ g^3$, ports $h^3$ and $h^4$ extend through the shaft $g$ from the upper side of one of the pistons to the lower side of the other, and vice versa. The exhaust is through the opposite port, $h'$ or $h^2$, from that through which the steam enters, and thence between the pistons $h^5\ h^6$, through the central port, $h^7$, and through the pipe $h^8$ into the exhaust-chamber within the hub $c'$.

To prevent the pistons $g^2\ g^3$ from pounding at the ends of their strokes, we locate the exhaust-ports in such a position that the said pistons will close the exhaust just before they reach the ends of their strokes, thereby retaining a sufficient amount of steam between them and the abutments to form steam-cushions.

The valve-rod $h^9$, to which the pistons $h^5$ and $h^6$ are secured, projects within the hub $c'$, and is there engaged at the proper intervals by a pair of cams, I $i$, which slide it a distance either in or out sufficient to slightly open the piston past one of the slots, $h$, when the live steam immediately enters and completes the sliding of rod $h^9$ to a full opening of the port. This, too, is an important feature, as it effects a full opening of the port without the delay which the travel of a long cam would require, and admits of the steam being held on the piston up to the very completion of its stroke. As the shaft $g$ is rocked backwardly and forwardly by the above means, the main cut-off valve F is rocked, and the steam thereby admitted alternately behind and in front of each of the pistons, the piston in front of which it is admitted becoming the abutment with respect to the piston behind which it is admitted, and the steam being exhausted through the opposite port from that through which it is admitted. The live steam enters the steam-chest within the hub $c$ through ports K in the end of the hub opposite the annular chamber in the cylinder-head, and the exhaust-steam passes out from the exhaust-chamber within the hub $c'$, through port $k$ in the end of the hub opposite the annular chamber in opposite cylinder-head.

To regulate the point at which the cut-off shall take place, and hence to vary the point at which the steam shall begin to work expansively, the rock-shaft $g$, the crank of which engages the main-valve arm, is extended through the end of the hub $c$ into the space within the hub $c'$, and is there provided with a pair of balanced arms, L, preferably curved, as shown, and provided with anti-friction rollers $l$, loosely mounted on studs set in their ends. A disk, M, loosely embracing the shaft B within the hub $c'$, is provided with a peculiar shaped cam-flange, $m$, extending in curved form toward the hub $c$, and provided with a lug, $m'$, separating the cam into two equal and similar sections, as shown. The disk M is connected with a ring, N, located outside of the end of the hub within the annular exhaust-chamber in the cylinder-head, by a series of rods, $m^2$, adapted to slide in their bearings in the end of the hub. The face of the ring N is provided with a channel, $n$, in which an anti-friction roller, $n'$, secured to the end of an arm, $n^2$, is adapted to be received. The arm $n^2$ is secured to the end of a rock-shaft, O, extending from the outside of the ring-projection D on the cylinder-head, through to a point within the annular chamber in the piston-head. The outer end of the shaft O is provided with an operating-arm, $o$, which is adapted to swing in a slot formed in a graduated sector-bar, P.

To prevent the rods $m^2$ from binding when lateral pressure is applied on the face of the ring N, a circular flange, $m^3$, formed about the shaft B within the exhaust-chamber, and forming an extended bearing for the shaft, is also constructed to form a bearing for the ring N, enabling it to be freely slid out and in.

The rollers on the ends of the arms L are adapted to engage the cam-flange $m$ on the disk M, as the hubs $c\ c'$ revolve, and be moved thereby at a later or earlier stage of the stroke, according to the distance which the disk M is advanced from the end of the hub, by means of the lever $o$, thus causing the shaft $g$ to rock positively and independently of the automatic cut-off power of the pistons $g^2\ g^3$, and positively determining the point at which the cut-off shall take place. The engagement of the cam $m$ with the arms L might tend to throw the valve F too far over; but this tendency is counteracted by the effect of the steam in the cylinder G, against which the cam $m$ acts, as it anticipates the action of the pistons $g^2\ g^3$ on the shaft $g$, and the arm L is held thereby in contact with the surface of the cam until the stroke is complete. By placing a guard over the cam $m$ the arm L might also be prevented from lifting.

If for any cause the auxiliary engine for actuating the valve F should fail to do its work the lug $m'$ would engage the arm L and throw it up sufficiently to reverse the valve.

The lever $o$ may be either operated by hand or it may be attached to the governor-sleeve and become automatic.

The main valve F and the valve actuating mechanism being attached to the end of the hub $c$ toward the hub $c'$, and the said end of the hub $c$ forming the cover of the steam-chest and at the same time the packing between the two hubs $c\ c'$, the valve and valve-actuating mechanism may be readily removed from within the steam-chest for inspection or other purposes through the exhaust end of the cylinder without disturbing the opposite end of the cylinder. The cylinder A is provided with a waste-cock, T, to free the condense-water from the cylinder in starting.

Instead of attaching the cams I and i to the hub c', rollers might be used in their places, and a cam attached to the end of the shaft g, adapted to engage the said rollers.

The main shaft B is journaled in bearings R, located at a suitable distance from the ends of the cylinder A, in supporting standards or brackets r, secured to a base, S.

The bearings R are made adjustable, so that the shaft B may be kept in perfect alignment, whereby wear on its bearing in the ends of the cylinder A may be prevented.

The standards r may be made separately and secured to the base or to the cylinder-head, or they may be formed integral with the base or cylinder-head, or they might depend from the ceiling or a suitable supporting-frame.

The construction of the motor is such that oil admitted with the live steam serves to lubricate all the joints and bearings, with the exception of the shaft-bearings outside of the motor proper.

Instead of placing the inclines and friction-rollers on the convex faces of the clutch-sections E e, they might be formed on the concave surfaces of the disk and ring and the sections E e be constructed as plane-faced cylinders.

It is evident that numerous other changes might be resorted to in the form and arrangement of the several parts described without departing from the spirit and scope of our invention; hence we do not wish to limit ourselves strictly to the construction herein set forth; but, Having fully described our invention, what we claim as new, and desire to secure by Letters Patent, is—

1. In a rotary motor, two or more concentric pistons adapted to revolve in a cylinder and alternately impart a rotary motion to the shaft and form a rigid abutment, substantially as set forth.

2. In a rotary motor, two or more concentric pistons adapted to revolve in a cylinder, and through the medium of clutch mechanism or its equivalent alternately impart a rotary motion to the shaft, and alternately form rigid abutments behind the moving piston, substantially as set forth.

3. In a rotary motor, two or more pistons adapted to revolve in a cylinder in the same direction and alternately to clutch the rotary shaft and stop to form an abutment, substantially as set forth.

4. In a rotary motor, two or more pistons adapted to revolve in a cylinder and be alternately locked to a rotary shaft, and carrying within themselves or their hubs cut-off-valve mechanism, substantially as set forth.

5. In a rotary motor, pistons adapted to revolve in a cylinder and alternately impart a rotary motion to the shaft, the said pistons to advance alternately and alternately form an abutment, the momentum of the stopping-piston being exerted in starting the opposite piston through the medium of a gas, steam, or water cushion, substantially as set forth.

6. The combination, with a cylinder and a shaft extending centrally through the same, of a pair of piston-hubs loosely mounted on the shaft, one of the hubs being adapted to form a steam-chest and the other to form an exhaust-chamber, substantially as set forth.

7. The combination, with a cylinder and a shaft extending centrally through the same, of a pair of pistons loosely mounted on the shaft, and clutches adapted to engage disks secured to the shaft and sleeves secured to the piston-hubs, and thereby lock the pistons to the shaft, substantially as set forth.

8. The combination, with a cylinder and a rotary shaft extending through the cylinder, of a pair of hollow piston-hubs loosely mounted on the shaft, the pistons secured to the hubs extending over the adjacent hub, a live-steam chamber formed in one of the cylinder-heads, an exhaust-steam chamber formed in the opposite cylinder-head, and ports leading from the said chambers to the hollow piston-hubs, substantially as set forth.

9. The combination, with a hollow piston-hub adapted to rotate on a shaft within a cylinder and further adapted to form a steam-chest, of an oscillating valve mounted on the shaft within the steam-chest and adapted to alternately open and close the ports leading from within the hub to the opposite sides of the piston secured to the hub, substantially as set forth.

10. The combination, with the hub, the piston attached thereto, and the ports leading from the opposite sides of the hub to the interior of the hub, of an oscillating valve adapted to close one of the ports to live steam, and at the same time open the opposite port to the exhaust through the hub of an adjacent piston, substantially as set forth.

11. The combination, with the hollow piston-hub adapted to form a steam-chest and an oscillating valve located within the hub, of an auxiliary engine located within the hollow hub adapted to actuate the valve, substantially as set forth.

12. The combination, with the hollow piston-hub adapted to form a steam-chest and an oscillating valve located within the hub, of an auxiliary engine located within the hub and adapted to rock its shaft, and thereby rock the valve, substantially as set forth.

13. The combination, with the hollow piston-hub adapted to form a steam-chest, of an oscillating valve balanced by the pressure of the steam within the hub and a valve-actuating engine located within the hub and adapted to receive its steam from the steam within the hub, substantially as set forth.

14. The combination, with the hollow piston-hub adapted to form a steam-chest and supply steam to the main cylinder, of an oscillating valve located within the hollow hub adapted to convey the exhaust-steam from the main cylinder into the hub of an adjacent piston, and a valve-actuating engine adapted to receive its live steam from the aforesaid steam-chest hub and exhaust into the said adjacent piston-hub, substantially as set forth.

15. In a rotary motor, an auxiliary engine or motor for actuating the main valve, consisting, essentially, of a cylinder provided with a pair of abutments, a rock-shaft provided with a pair of pistons, and a valve for regulating the admission of steam thereto, substantially as set forth.

16. In an auxiliary valve-actuating engine, the combination, with a cylinder provided with a pair of abutments and a rock-shaft provided with a pair of pistons, of ports leading from the steam-chest into the cylinder on opposite sides of one of the abutments and thence through the rock-shaft to opposite sides of the pistons, substantially as set forth.

17. The combination, with the valve-rod for actuating the valves and admitting steam from one of the hollow piston-hubs to the valve-actuating engine-cylinder, of a pair of cams located within the other piston-hub and adapted to engage the said valve-rod and slide it a short distance, substantially as set forth.

18. In an auxiliary engine adapted to actuate the main valve of a rotary engine, a cut-off valve adapted to be actuated partly by a cam, or its equivalent, and partly by steam, substantially as set forth.

19. The combination, with the rock-shaft of the valve-actuating engine, of a pair of arms adapted to engage a sliding cam and thereby determine the point at which the steam shall begin to work expansively, substantially as set forth.

20. The combination, with the exhaust-hub, of a cam-flange partially embracing the main shaft therein, a channel-faced ring located outside of the hub and connected with the cam-flange by sliding rods, and a rock-shaft extending from the outside of the cylinder-head into engagement with the ring for moving the cam-flange forwardly and backwardly with the hub, for the purpose substantially as set forth.

21. The combination, with the sliding channel-faced ring for operating the cam-flange, of the extended main-shaft bearing within the recessed cylinder-head, said extended bearing forming at the same time a bearing for the ring, for the purpose substantially as set forth.

22. The combination, with the operating arms on the end of the valve-actuating rock-shaft, of the sliding cam-flange located within the exhaust-hub and provided with a central lug for positively reversing the valve in case of failure on the part of the valve-actuating engine, substantially as set forth.

23. The combination, with the hollow exhaust-piston hub and the steam-chest piston-hub, of the valve and valve-actuating mechanism attached to the end of the steam-chest piston-hub and adapted to be removed through the exhaust end of the main cylinder, substantially as set forth.

24. The combination, with the clutch adapted to lock the piston to the main shaft, of brackets adapted to hold the friction-rollers against displacement when the parts are removed, substantially as set forth.

25. The combination, with the end of the steam-chest piston-hub and the sleeve attached thereto, of the clutch-sections secured to the sleeve by screws which partially engage one end of the clutch-sections, whereby the live steam within the recess in the cylinder-head automatically forces the end of the clutch-section into close contact with the cylinder-head, substantially as set forth.

26. The combination, with the end of the steam-chest piston-hub, the sleeve attached thereto, and the clutch-sections keyed thereon, of adjusting-screws adapted to engage the ends of the sleeve and the clutch-sections and take-up wear on the end of the piston-hub and clutch, substantially as set forth.

In testimony whereof we have signed this specification in the presence of two subscribing witnesses.

ABNER D. BAKER.
FRANCIS P. HUYCK.

Witnesses:
H. M. HAUSER,
FRANK A. SEIBERLING.